Patented Dec. 18, 1928.

1,695,612

UNITED STATES PATENT OFFICE.

GEORG SCHRÖDER, OF SCHOMBERG, NEAR WILDBAD, GERMANY.

METHOD OF PRODUCING REMEDIES FROM GLANDULAR ORGANS.

No Drawing. Application filed November 29, 1926, Serial No. 151,614, and in Germany December 16, 1925.

My invention refers to the production of protective preparations and remedies, more especially from glandular organs. It is an object of my invention to provide means whereby such preparations and remedies can be produced in a particularly simple and efficient manner.

To this end a suspension of cells prepared from such organs in a well known manner is exposed to low temperatures, being thereby caused to freeze. After having been left for some time in the congealed state the suspension is allowed to thaw and the cell fluid is now filtered. Of the several glandular organs quite especially the spleen and thymus have proved to be particularly effective, however also the liver and other glandular organs can be utilized. The preparations obtained by this treatment are particularly useful in the treatment of infectious diseases and can be employed as protective substances as well as for remedial purposes.

The cell fluids obtained in the manner above described can be rendered still more effective by vaccinating them with virulent bacteria, which are then killed by allowing the fluid to act upon them for a period of time. The particular kinds of bacteria are chosen in accordance with the infectious disease which shall be treated with the respective preparation.

*Example.*—Spleen is skinned in sterile form, the pulp is scraped off the trabeculæ, and the residual soft pulp-like mass is triturated with about an equal quantity of sterile glass sand (pulverized glass). During trituration about 50 ccms. of a ½ per cent carbolized salt solution (physiological NaCl solution, to which ½ per cent carbolic acid has been added) is gradually added, this quantity being calculated on a spleen of medium size. The mixture is now allowed to stand a few hours in the ice box and is then cooled down so as to be frozen throughout during at least twenty-four hours. The spleen pulp is now allowed to thaw and is subjected to filtration, whereby the limpid spleen cell fluid is obtained, being flesh coloured to dark brown. This fluid is ready for use for subcutaneous or intravenous injections.

In a similar manner as described above with reference to spleen, thymus and other suitable organs can be acted upon.

The efficiency of cell fluids of the kind aforesaid can be increased by treating them with bacteria in such manner that a specific vaccine is produced. To this end I add to about 10 ccms. of the cell fluid obtained as above about 1 mg. of a virulent tubercle bacilli culture (one drop) of human or bovine type. The mixture is shaken in a shaker apparatus and is then kept at about 37° C. during about three weeks. By this treatment the excitant is killed.

Other kinds of bacteria can be employed in a similar manner for the production of antigens.

Various changes may be made in the details of the operations and particularly in the proportions of the ingredients present in the solutions used without departing from the invention or sacrificing the advantages thereof.

I claim:—

1. The method of producing protective preparations and remedies comprising causing the suspension of cells of a glandular organ to freeze, allowing it to thaw and filtering.

2. The method of producing protective preparations and remedies comprising preparing a suspension of cells of a glandular organ adding an extraction agent causing the mixture to freeze, allowing it to thaw and filtering it.

3. The method of producing protective preparations and remedies comprising mixing a suspension of a comminuted glandular organ with a physiological salt solution, causing the mixture to freeze and keeping it frozen during twentyfour hours, allowing the frozen pulp to thaw, and filtering.

4. The method of producing protective preparations and remedies comprising preparing a suspension of comminuted spleen mixing said suspension with a physiological salt solution, causing the mixture to freeze and keeping it frozen during twenty-four hours, allowing the frozen pulp to thaw, and filtering.

5. The method of producing protective preparations and remedies comprising causing the suspension of cells of a glandular organ to freeze, allowing it to thaw, filtering, vaccinating with virulent bacteria and allowing same to be killed by the prolonged action of the fluid.

6. The method of producing protective preparations and remedies comprising preparing a suspension of comminuted spleen mixing said suspension with a physiological salt solution, causing the mixture to freeze, keeping it frozen during twenty-four hours, allowing the frozen pulp to thaw, filtering and vaccinating the fluid thus obtained with bacteria at an elevated temperature during several weeks.

7. The method of producing protective preparations and remedies comprising mixing a suspension of comminuted spleen with about 50 ccms. of a ½ per cent carbolized salt solution, causing the mixture to freeze, keeping it frozen during at least twenty-four hours, allowing it to thaw and filtering.

8. The method of producing protective preparations and remedies comprising mixing a suspension of comminuted spleen with about 50 ccms. of a ½ per cent carbolized salt solution, causing the mixture to freeze, keeping it frozen during at least twenty-four hours, allowing it to thaw, filtering, vaccinating part of the filtrate with virulent tubercle bacilli and keeping the vaccinated liquid at about 37° C. during three weeks.

In testimony whereof I affix my signature.

GEORG SCHRÖDER